US011636080B2

(12) United States Patent
Ahmed-Rengers et al.

(10) Patent No.: US 11,636,080 B2
(45) Date of Patent: Apr. 25, 2023

(54) DATA STRUCTURE STORAGE OPTIMISATION

(71) Applicant: RKVST LIMITED, Beverley (GB)

(72) Inventors: Mansoor Ahmed-Rengers, Cambridge (GB); Jonathan Geater, Cambridge (GB)

(73) Assignee: RKVST Limited, Beverley (GB)

( * ) Notice: Subject to any disclaimer, the term of this patent is extended or adjusted under 35 U.S.C. 154(b) by 93 days.

(21) Appl. No.: 17/087,055

(22) Filed: Nov. 2, 2020

(65) Prior Publication Data

US 2021/0141780 A1    May 13, 2021

(51) Int. Cl.
*G06F 16/22* (2019.01)
*G06F 16/23* (2019.01)
*H04L 9/32* (2006.01)

(52) U.S. Cl.
CPC ...... *G06F 16/2272* (2019.01); *G06F 16/2365* (2019.01); *H04L 9/3242* (2013.01); *H04L 9/3247* (2013.01)

(58) Field of Classification Search
CPC ............ G06F 16/2272; G06F 16/2365; G06F 16/215; G06F 21/64; H04L 9/3242; H04L 9/3247; H04L 9/50; H04L 9/3239; H04L 9/3236
See application file for complete search history.

(56) References Cited

U.S. PATENT DOCUMENTS

| 2018/0323963 | A1 | 11/2018 | Stollman |
| 2019/0035014 | A1 | 1/2019 | Bell et al. |
| 2020/0134066 | A1* | 4/2020 | Yegorin ............... G06F 16/2379 |

FOREIGN PATENT DOCUMENTS

WO    2019/209303 A1    10/2019

OTHER PUBLICATIONS

Bartoletti, A Proof-of-Stake Protocol for Consensus on Bitcoin Subchains, pp. 1-16 (Year: 2017).*
Intellectual Property Office, Search Report under Section 17(5), issued for Application No. GB1916295.7 dated Aug. 10, 2020 (3 pages).

* cited by examiner

*Primary Examiner* — Albert M Phillips, III
(74) *Attorney, Agent, or Firm* — Polsinelli PC; Gregory P. Durbin

(57) ABSTRACT

A method of maintaining a data structure comprising: creating a data block; transmitting a message to validator devices requesting permission to add said data block to the data structure; determining that consensus is reached, and in response: forming a first sub-chain in the data-structure by adding the data block to the data structure, the first sub-chain starting with a genesis block and ending with said data block, wherein the data block comprises a block number indicating the number of blocks in the data structure from the genesis block, and creating a further data block; transmitting a further message to the validator devices requesting permission to add said further data block to the data structure; determining that consensus is reached, and in response, forming a second sub-chain by adding the further data block to the data structure after said data block, the second sub-chain starting with said further data block.

15 Claims, 9 Drawing Sheets

DATA STRUCTURE STORAGE OPTIMISATION

CROSS-REFERENCE TO RELATED APPLICATION

This application is related to and claims priority under from United Kingdom Patent Application No. 1916295.7 filed Nov. 8, 2019 entitled "Data Structure Storage Optimisation," the entire contents of which is incorporated herein by reference for all purposes.

BACKGROUND

Blockchains, and more generally distributed ledger technologies, are emerging as a fundamental building block of new digital communications platforms. The ability to securely store, trade, and compute data in a shared responsibility system with no single central point of authority is a very powerful architecture.

One of the most important and powerful features of a blockchain and other distributed ledger technologies is its immutability. That is, a blockchain provides a permanent, indelible, and unalterable history of data.

In a standard blockchain or cryptographic ledger the immutability and integrity of the chain is maintained through a chain of hashes: the cryptographic hash of each block stored in its successor so as to link them together and make it impossible to modify, add, or remove anything from a block in the chain.

SUMMARY

Blockchains impose certain infrastructure requirements that make their adoption into enterprise systems difficult. One of these requirements is that of an endless supply of storage. Blockchains, by their very nature, are append-only: information can only be added to them. Furthermore, to verify the integrity of a blockchain, one needs to have access to the entire blockchain—from the first block to the current one (at the end of the chain). This means that if one of the participants goes offline and later wants to join the network again, it must contact some other member and download every block since the system was started. This is unacceptable for systems that are expected to run for many years.

This is just one of the situations where blockchains are hampered by their ever-increasing need for storage. Other situations where this is a problem include:
  In case where network participants run out of physical storage space, they must either stop accepting new blocks, purchase more storage or delete old blocks and rely on other network participants to provide them with the old blocks on demand.
  Whenever a new participant joins a network, it needs to download the entire blockchain and verify it block-by-block. If a network has been running for years, this operation would take a prohibitive amount of time.

Known techniques exist that aim to mitigate the storage problem by reducing the storage space required for the blocks. This is usually done by either squashing empty blocks together (only retaining their hashes) or by using some form of compression to reduce the storage space requirement for all blocks in general.

The inventors have recognised that whilst these solutions help to a certain extent, they only delay the inevitable. Eventually the same storage issues arise; in fact, because of the additional work of decompression, the time requirement for new nodes joining the network may be higher than uncompressed blocks.

Embodiments of the present disclosure allow network participants to prune away old data while preserving the following desirable properties:
  The current chain remains verifiable;
  The points of time at which the pruning was authorised are clearly identifiable by all participants;
  The participants that authorised the pruning of the chain are clearly identified by way of, for example, digital signatures associated with the participants; and
  The participants in pruning the chain are in the same security context as the participants in the consensus mechanism.

According to one aspect of the present disclosure there is provided a method of maintaining a data structure comprising a plurality of linked data blocks, the method implemented on a computing device, and comprising: creating a data block to be added to the data structure; transmitting a message to a plurality of validator computing devices over a communication network, said message requesting permission to add said data block to the data structure; determining that consensus is reached by the plurality of validator computing devices that said data block can be added to the data structure, and in response to said determining: forming a first sub-chain in the data-structure by adding the data block to the data structure, the first sub-chain starting with a genesis block and ending with said data block, wherein the data block comprises a block number indicating the number of blocks in the data structure from the genesis block, and creating a further data block; the method further comprising transmitting a further message to the plurality of validator computing devices over a communication network, said further message requesting permission to add said further data block to the data structure; determining that consensus is reached by the plurality of validator computing devices that said further data block can be added to the data structure, and in response to said determining, forming a second sub-chain by adding the further data block to the data structure after said data block, the second sub-chain starting with said further data block, wherein the further block comprises (i) a first block number indicating the number of blocks in the data structure from the genesis block; and (ii) a second block number indicating the number of blocks in the second sub-chain from the further data block.

Creating the block to be added to the data structure may comprise: generating a request, the request comprising a block number associated with an end data block at an end of the data structure: generating an integrity measure associated with the computing device; transmitting the request and the integrity measure to one or more authorised signatory computing devices over the communication network; receiving, via the communication network, at least one integrity measure associated with one or more authorised signatory computing devices; wherein said block comprises the request, the integrity measure associated with the computing device, the at least one integrity measure associated with the one or more authorised signatory computing devices, and a cryptographic hash of the end data block.

The further data block once added to the data structure may comprise the request, the integrity measure associated with the computing device, the at least one integrity measure associated with the one or more authorised signatory computing devices, and a cryptographic hash of the data block.

The request may additionally comprises a timestamp indicating a time when the request was generated, Creating the data block to be added to the data structure may be triggered in response to detecting that the data structure satisfies predetermined criteria.

Creating the data block to be added to the data structure may be triggered in response to detecting that a length of the data structure has reached a predetermined threshold number of blocks.

Creating the data block to be added to the data structure may be triggered in response to detecting that a total storage size of the blocks of the data structure has reached a predetermined threshold size.

Creating the data block to be added to the data structure may be triggered in response to receiving a message from a remote computing device.

The further data block may comprise the signed request and a cryptographic hash of said data block.

The integrity measure associated with the computing device may comprise a digital signature, a Message Authentication Code or a cryptographic hash.

Each of the at least one integrity measure associated with the one or more authorised signatory computing devices may comprise a digital signature, a Message Authentication Code or a cryptographic hash.

The data structure comprising the plurality of linked data blocks may be stored in memory of the computing device, and the method may further comprise removing from memory one or more data blocks located in the data structure between the genesis block and said data block.

The data block may comprise a cryptographic hash of the genesis block.

The data structure is structured in accordance with a distributed ledger technology. The distributed ledger technology may be blockchain.

According to another aspect of the present disclosure there is provided a computing device for maintaining a data structure comprising a plurality of linked data blocks, wherein the data structure is stored in memory accessible to the computing device, and the computing device comprising a processor configured to: create a data block to be added to the data structure; transmit a message to a plurality of validator computing devices over a communication network, said message requesting permission to add said data block to the data structure; determine that consensus is reached by the plurality of validator computing devices that said data block can be added to the data structure, and in response to said determination: form a first sub-chain in the data-structure by adding the data block to the data structure, the first sub-chain starting with a genesis block and ending with said data block, wherein the data block comprises a block number indicating the number of blocks in the data structure from the genesis block, and create a further data block. The processor is further configured to transmit a further message to the plurality of validator computing devices over a communication network, said further message requesting permission to add said further data block to the data structure; and determine that consensus is reached by the plurality of validator computing devices that said further data block can be added to the data structure, and in response to said determination, form a second sub-chain by adding the further data block to the data structure after said data block, the second sub-chain starting with said further data block, wherein the further block comprises (i) a first block number indicating the number of blocks in the data structure from the genesis block; and (ii) a second block number indicating the number of blocks in the second sub-chain from the further data block.

According to another aspect of the present disclosure there is provided a method of verifying a data structure comprising at least one plurality of linked data blocks, the method performed on a computing device, and comprising: reading a data block of the data structure; determining if the data block is a sub-chain end block at an end of a sub-chain in the data structure, the sub-chain comprising a first data block at a start of the sub-chain and at least one intervening data block between the first data block and the sub-chain end block; wherein if said data block is a sub-chain end block, the method comprises: extracting a cryptographic hash of the first data block at the start of the sub-chain from the end data block; computing a cryptographic hash of the first data block at the start of the sub-chain; determining if the extracted cryptographic hash of the first data block matches the computed cryptographic hash of the first data block, and successfully verifying the integrity of the data blocks of the sub-chain based on the extracted cryptographic hash of the first data block matching the computed cryptographic hash of the first data block.

If said data block is not a sub-chain end block, the method may comprise: determining if a cryptographic hash of a preceding data block matches a cryptographic hash stored in the data block, and successfully verifying the integrity of the preceding data block based on the cryptographic hash of the preceding data block matching a cryptographic hash stored in the data block.

Determining if the data block is a sub-chain end block may be based on the format of the data block.

The data structure may be structured in accordance with a distributed ledger technology. The distributed ledger technology may be blockchain.

According to another aspect of the present disclosure there is provided a computing device for verifying a data structure comprising a plurality of linked data blocks, wherein the data structure is stored in memory accessible to the computing device, and the computing device comprising a processor configured to: read a data block of the data structure; determine if the data block is a sub-chain end block at an end of a sub-chain in the data structure, the sub-chain comprising a first data block at a start of the sub-chain and at least one intervening data block between the first data block and the sub-chain end block; wherein if said data block is a sub-chain end block, the processor is further configured to: extract a cryptographic hash of the first data block at the start of the sub-chain from the end data block; compute a cryptographic hash of the first data block at the start of the sub-chain; and determine if the extracted cryptographic hash of the first data block matches the computed cryptographic hash of the first data block, an successfully verifying the integrity of the data blocks of the sub-chain based on the extracted cryptographic hash of the first data block matching the computed cryptographic hash of the first data block.

According to another aspect of the present disclosure there is provided a computer-readable storage medium comprising instructions which, when executed by a processor of a computing device cause the computing device to perform the method steps described herein.

The instructions may be provided on a carrier such as a disk, CD- or DVD-ROM, programmed memory such as read-only memory (Firmware), or on a data carrier such as an optical or electrical signal carrier. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Embodiments will now be described by way of example only. In particular, whilst embodiments are described with reference to data stored in a blockchain, embodiments extend to data that is stored in accordance with other distributed ledger technologies.

Figure 1:
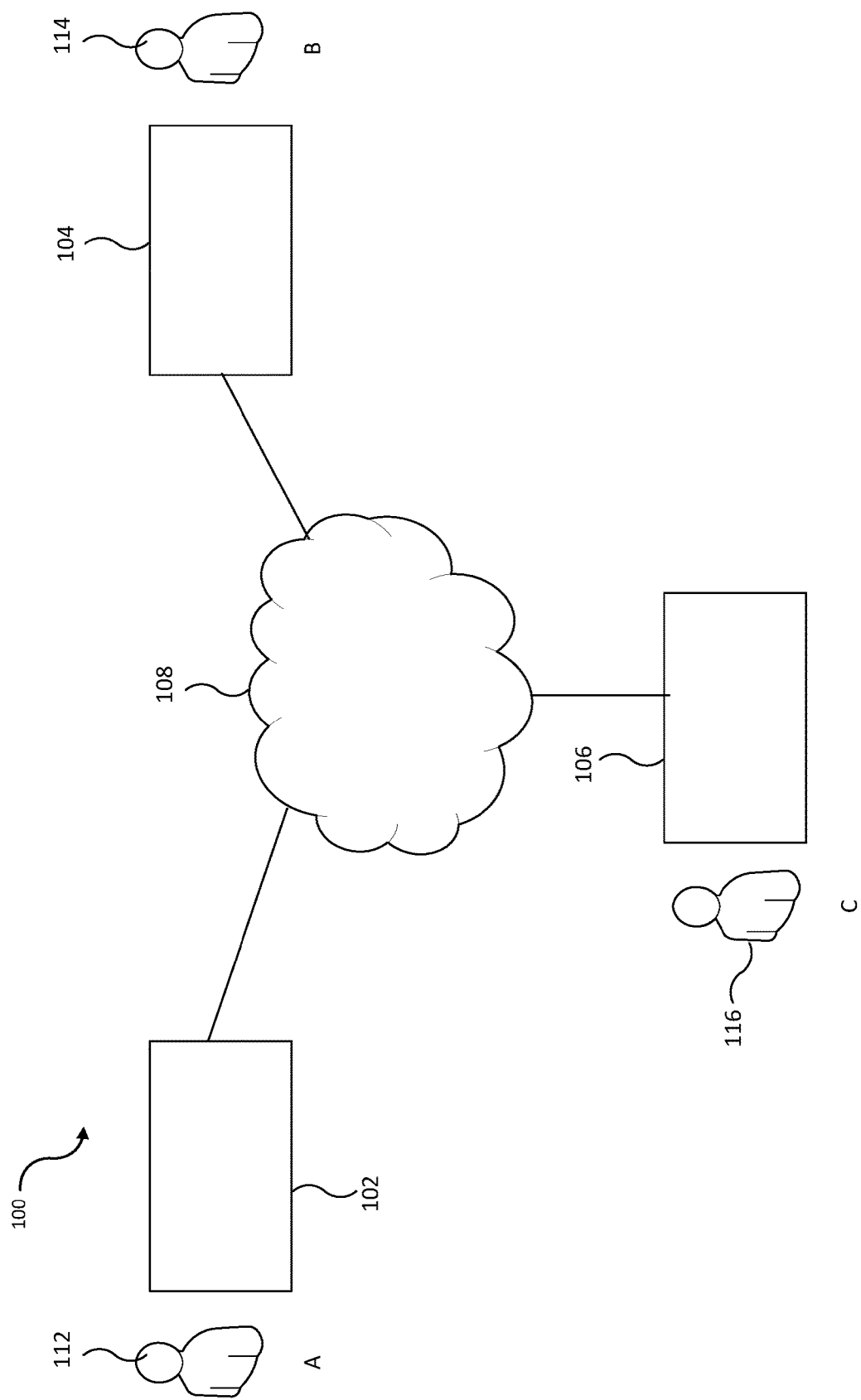
FIG. 1 is schematic block diagram of a communication system.

FIG. 1 illustrates a communication system 100 comprising a plurality of computing devices (also referred to herein as nodes) coupled to a network 108 (e.g. the Internet). For simplicity three computing devices are shown, comprising a first computing device 102 associated with user A 112, a second computing device 104 associated with user B 114 and a third computing device 106 associated with user C 116. Each of the computing devices 102, 104, 106 are configured to communicate data to each other over the network 108 so as to store data on a blockchain which is maintained in memory associated with each computing device, and are therefore referred to herein as participant nodes. It will be appreciated that many more participant nodes than that shown in FIG. 1 that involved in storing data on the blockchain, and the communication system 100 may comprise other computing devices coupled to the network 108 that are not participant nodes.

Each computing device is associated with a respective user. In one example, user B 114 may be an industrial machine manufacturer who manufactures a particular industrial machine, user A 112 may be a factory owner who has purchased the industrial machine, and user C 116 may be a worker of the factory who is required to performs checks on the industrial machine. In this example, each user uses their associated computing device to store data on a blockchain which is maintained in memory associated with each computing device. For example, user B 114 may upon manufacture of the industrial machine, store data on the blockchain such as model number, manufacture date, country of manufacture etc. and after software updates have been pushed to the industrial machine user B 114 may store data on the blockchain such as software upgrade version number, software upgrade etc. User A 112 upon purchasing the industrial machine may store data on the blockchain such as purchase date, supplier details, and after having the industrial machine serviced may store data on the blockchain such as name of servicer, date of service, results of service etc. User C 116 may upon performing checks on the industrial machine may store data on the blockchain such as a parameter of the industrial machine (e.g. operating temperature, speed, voltage etc.), date of check, name of person performing the check etc.

The network 108 may be any suitable network which has the ability to provide a communication channel between the computing devices. Each computing device may be, for example, a mobile phone, a personal computer ("PC"), a tablet, laptop, or other embedded device able to connect to the network 108. Each computing device is arranged to receive information from, and output information to, the user of the computing device.

Figure 2:
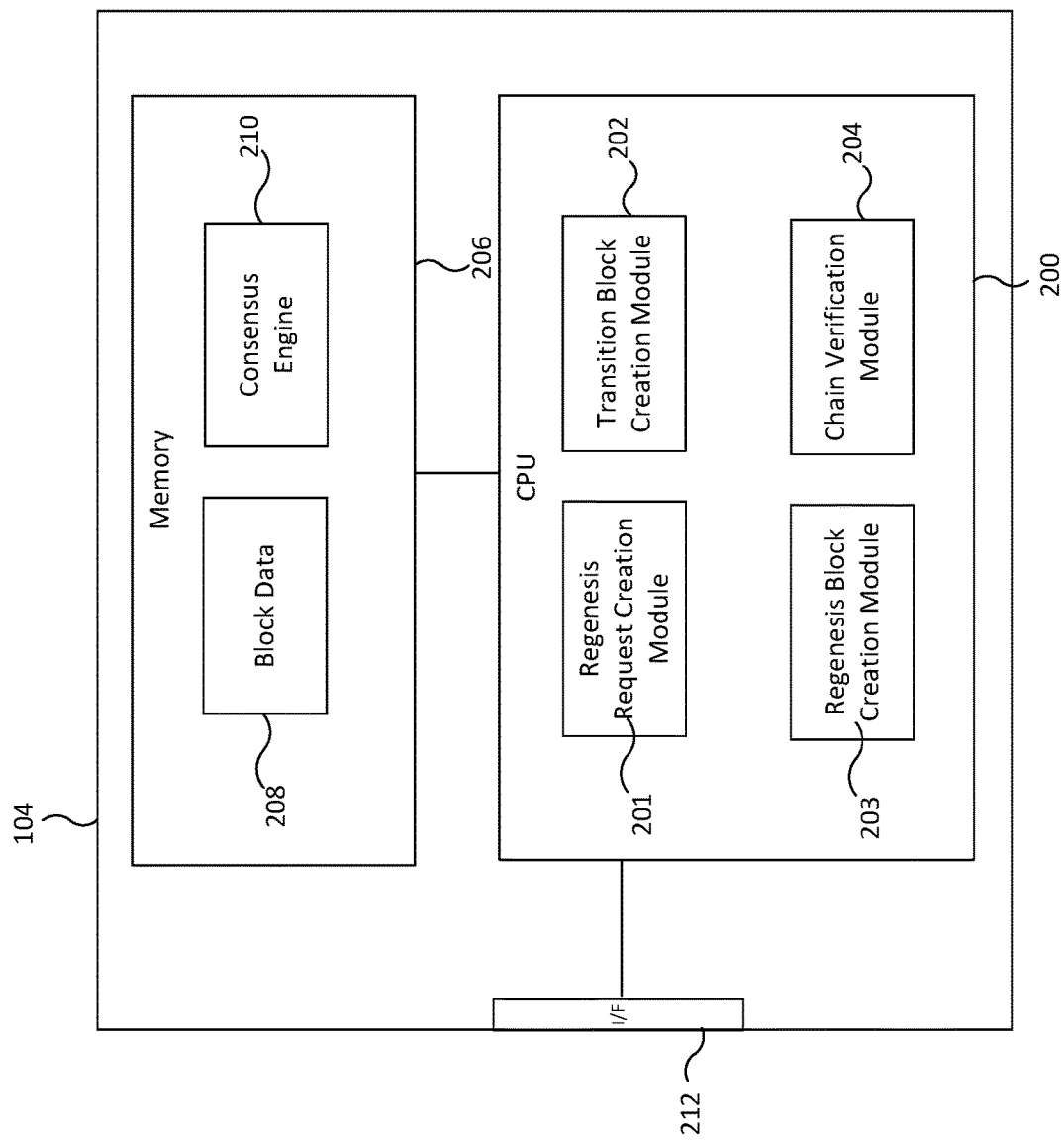
FIG. 2 is a schematic block diagram of a computing device in the communication system.

FIG. 2 illustrates a detailed view of a computing device (e.g. a computing device 104) in the communication system 100. The computing device 104 comprises a central processing unit ("CPU") 200, to which is connected a memory 206 and a network interface 212 for communication with the network 108. As shown in FIG. 2, the CPU 200 comprises a regenesis request creation module 201, a transition block creation module 202, a regenesis block creation module 203, and a chain verification module 204. As described in more detail below, the regenesis request creation module 201 is operable to create regenesis requests, the transition block creation module 202 is operable to create transition blocks, the regenesis block creation module 203 is operable to create regenesis blocks, and the chain verification module 204 is operable to verify a blockchain comprising a transition block and a regenesis block.

A blockchain comprises blocks of data. The memory 206 is configured to store block data 208 comprising blocks of a blockchain. It will be appreciated that whilst FIG. 2 illustrates the computing device 104 storing the block data 208 locally, some or all of the block data 208 may be stored in one or more external storage devices (e.g. in cloud storage or in a remote storage device coupled to the computing device 104).

Whilst embodiments are described with reference to a blockchain, this is just one example of a distributed ledger technology in which embodiments of the present disclosure can be used in. In particular, the term "block" is used herein to refer generally to a sequence of bits or bytes storing data, which may be added to a data structure which is structured in accordance with a distributed ledger technology. It will be appreciated the format of the block and how it links to other blocks in the data structure will vary in dependence on the particular distributed ledger technology.

The memory also stores a consensus engine 210. The consensus engine 210 comprises instructions which when executed by the CPU 202 implement a consensus mechanism. The particular implementation details of the consensus mechanism may vary greatly, but in a general sense, the consensus mechanism defines how the consensus engine 210 knows how it will be convinced that a block is valid and should be added to the chain. In particular, the consensus mechanism defines how the consensus engine 210 knows to accept a block that originated from another computing device on the network, and how the consensus engine 210 can verify that a block created by the computing device 104 was accepted by the network (i.e. accepted by consensus nodes in the network).

A consensus node (also referred to herein as a validator computing device) is a computing device coupled to the network 108 which plays a role in determining whether a new block is to be accepted onto the blockchain. A consensus node may also be a participant node, however this is not essential and thus a consensus node may not also be a participant node. In implementations, the consensus nodes may correspond to zero or more the participant nodes. In one implementation, the consensus nodes may correspond to the participant nodes (i.e. all of the participant nodes are also involved in the consensus of whether to accept a new block onto the blockchain that is stored by each of the participant nodes).

In embodiments of the present disclosure, any known consensus mechanism may be used by the consensus engine 210. Details of the particular consensus mechanism that is used by the consensus engine 210 falls outside the scope of the present disclosure, however the consensus mechanism typically falls into one of the below types:

- all the authorized validator computing devices are somehow known to the consensus engine 210, and when the consensus engine 210 is checking, it can see who and how many of the validator computing devices have approved the new block. When enough of the validator computing devices have approved the new block (e.g., a predetermined number of validator computing devices have approved the new block or a predetermined percentage of the total validator computing devices have approved the new block) the consensus engine 210 accepts the new block.
- the consensus engine 210 does not know all the authorized validator computing devices but instead stores sufficient data and code to re-create (from first principles) some mathematical or cryptographic puzzle that proves that they all know the same secret, or are working together, or similar.

Although not shown in FIG. 2, the computing device 104 may comprise an input device such as a keypad, a touch-sensitive display, and/or a microphone. The computing device 104 may also comprise an output device such as a display (which may be touch-sensitive) and/or speakers.

The computing devices 102 and 106 of the other participants of the blockchain also store their own copy of the blocks of the blockchain in memory associated with the device.

Figure 3:
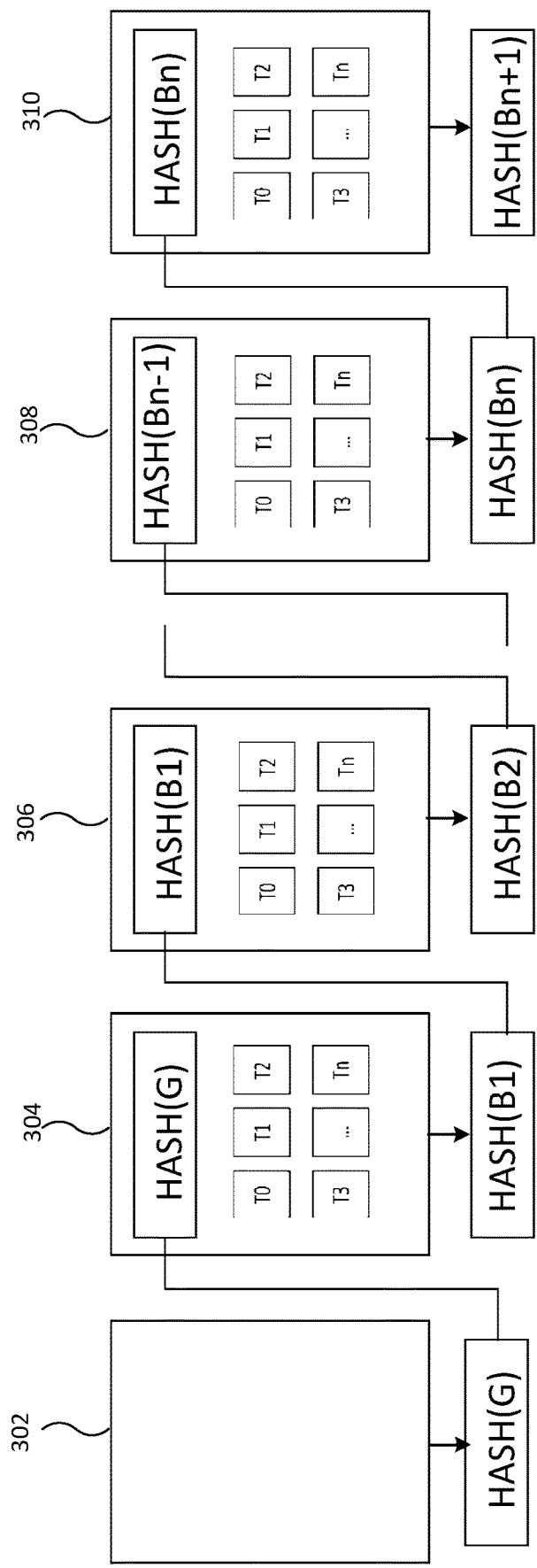
FIG. 3 illustrates the known composition of a blockchain.

FIG. 3 illustrates the known linear data structure of a blockchain. At the beginning of the blockchain there is a genesis block 302. As shown in FIG. 3, each block comprises at least one portion of data (labelled as T0-Tn), commonly referred to as transactions. Each block that follows the genesis block 302 comprises the cryptographic hash of the preceding block. For example, as shown in FIG. 3, block 1 (B1) 304 comprises the cryptographic hash, HASH(G), of the preceding block (the genesis block 302). Similarly, block 2 (B2) 306 comprises the cryptographic hash, HASH (B1), of the preceding block (block 304). Expressed another way, the cryptographic hash of each block is stored in its successor.

As illustrated in FIG. 3, in a standard blockchain or cryptographic ledger the immutability and integrity of the chain is maintained through a chain of hashes: the cryptographic hash of each block stored in its successor so as to link them together and make it impossible to modify, add, or remove anything in the chain. This is so because the 'nodes' (participants) in reaching consensus and validating the chain recalculate the hash of each block and discard/revoke any that don't match. Thus, in a standard blockchain, verification of data involves traversing the entire chain from the current block to the first block (the genesis block) and verifying that the hashes match at every step of the way. This need to traverse back to the genesis block introduces the need to store an unbounded amount of data for an indeterminate amount of time. This is not feasible for real world infrastructures with long run-times.

Embodiments of the present disclosure maintain integrity of the chain as a whole whilst enabling the creation of segmented 'sub-chains', each of which can be independently trusted. We refer herein to "regenesis" which refers to the process whereby a successor sub-chain is created based on the existing blockchain upon adding a new block to the existing blockchain when certain predetermined criteria are met. This is described in more detail below. The term "sub-chain" is used herein to refer to a plurality of linked data blocks within a data structure.

Figure 4:
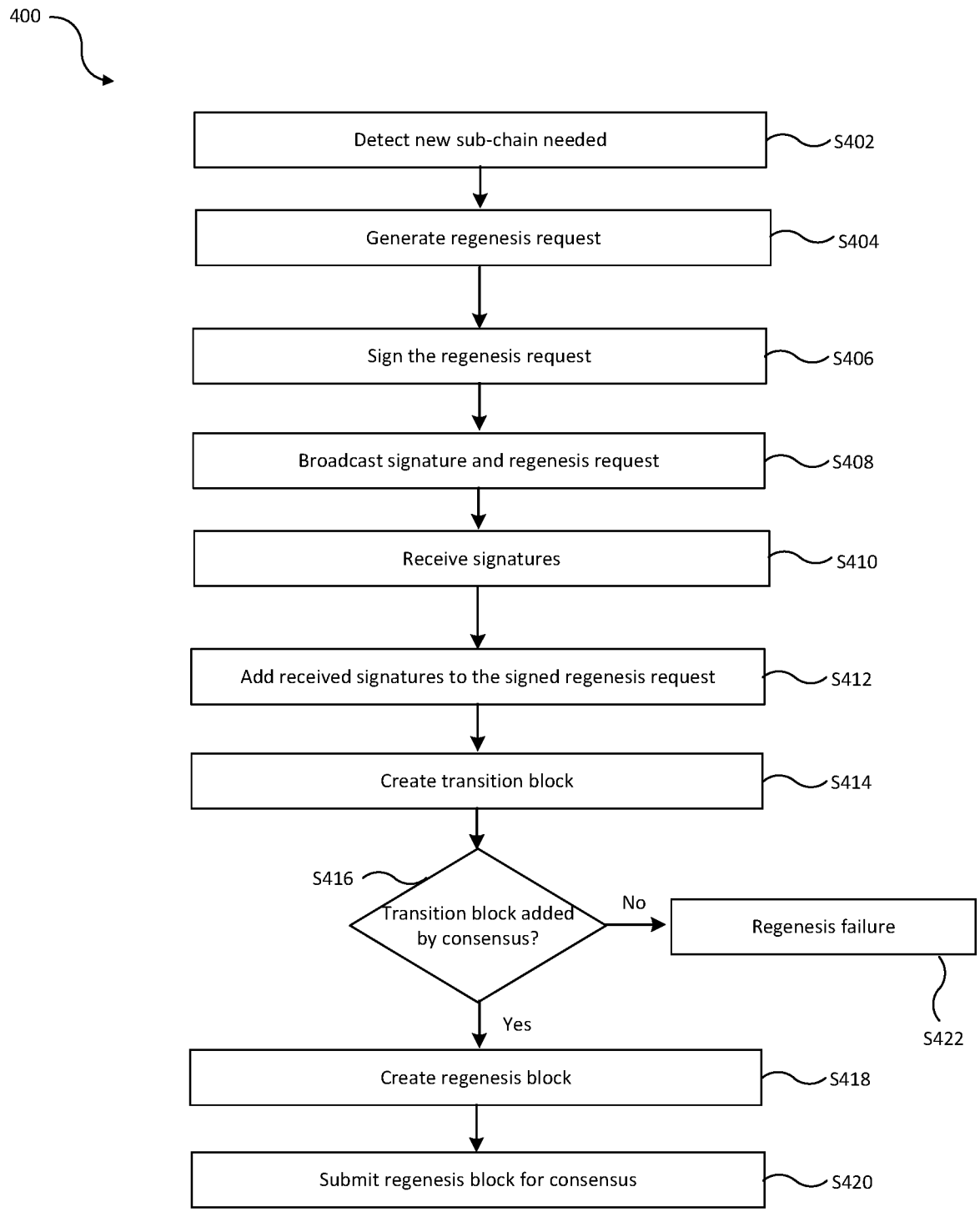
FIG. 4 is a flow chart of a process performed by a computing device in the communication system to create a transition block and a regenesis block.

Reference is now made to FIG. 4, which shows a flow chart of a process 400 performed by a consensus node, e.g. the computing device 104, to create a transition block and a regenesis block as part of the regenesis process.

At step S402, the computing device 104 detects that a new sub-chain is needed.

The computing device 104 may detect that a new sub-chain is needed based on determining that the blockchain that is stored in memory associated with the computing device 104 meets predetermined criteria and thus a new successor sub-chain is needed. For example, at step S402, the computing device 104 may detect that the length of the blockchain has reached a predetermined threshold number of blocks. In another example, the computing device 104 may detect that the total storage size of the blocks of the blockchain has reached a predetermined threshold size.

In another example, the computing device 104 may detect that a new sub-chain is needed based on receiving a message from a remote computing device (e.g. an authorised entity).

In response to the detection at step S402, the computing device creates a transition block to be added to the blockchain. Steps S404-S414 illustrate one example of how this transition block is created.

At step S404 the regenesis request creation module 201 on the computing device 104 generates a regenesis request. The regenesis request comprises a sub-chain block number 502 and a block number 504 since the genesis block.

Prior to any regenesis occurring, the blockchain is considered a first sub-chain starting with the genesis block. The sub-chain block number 502 indicates the number of blocks in the sub-chain from the first block in the sub-chain (noting that prior to any regenesis occurring, the first block in the sub-chain is the genesis block). The block number 504 indicates the number of blocks in the blockchain from the genesis block. Thus, prior to any regenesis occurring, the sub-chain block number 502 and the block number 504 since the genesis block will have the same value.

At step S406, the computing device 104 adds an integrity measure to the regenesis request. As is known to persons skilled in the art an 'integrity measure' is a piece of metadata that accompanies a piece of data to provide proof or confidence that the data has high integrity: that is to say that it is complete (has not had portions removed or truncated); it is unmodified (no part of the data has been changed since it was created); and that it is authentic (it really came from the person/place/device it claims to have come from). Optionally there may also be a time or validity element to determine whether a trusted source has been compromised or revoked (i.e., it was trusted, and the data might have been good when it was created, but it's not anymore). In short, this integrity measure metadata convinces the receiver of data that they are seeing exactly what the sender really sent.

The integrity measure may take various forms. In one example the integrity measure is a digital signature. In this example, at step S406 the computing device 104 signs the generated regenesis request to generate a digital signature. For example, the digital signature may be created by the computing device 104 by encrypting a cryptographic hash of the regenesis request using a cryptographic key (e.g. a private key) associated with the computing device 104.

In this example, the computing device is considered as an "authorised signatory node" because it is a computing device has been granted the privilege to authorize regenesis. The creation of the integrity measure at step S406 may be performed by the regenesis request creation module 201 (outside of the automatically running software of the consensus engine 210). Alternatively, the creation of the integrity measure at step S406 may be performed by the consensus engine 210.

At step S408, the computing device 104 transmits the regenesis request and the digital signature to all authorised signatory nodes that are coupled to the network 108. As noted above, an authorised signatory node is a computing device that has been granted the privilege to authorize regenesis. There may be a one-to-one correlation between authorised signatory nodes and consensus nodes however this is merely an example. For example, the authorised signatory nodes are not necessarily the same set as the consensus nodes. In implementations, the authorised signatory nodes may correspond to zero or more of the consensus nodes. The correspondence between consensus nodes and authorised signatory nodes is purely a design decision.

Considering an example in communication system 100 shown in FIG. 1, whereby the participant nodes (e.g. computing device 102, computing device 104 and computing device 106) are authorised signatory nodes, the computing device 104 transmits the signed regenesis request to computing device 102 and computing device 106 over the network 108. The computing device 104 transmits the signed regenesis request via the network interface 212.

Upon receipt of the regenesis request and the digital signature of the sending authorised signatory (computing device 104), each of the other authorised signatory nodes (e.g. computing device 102 and computing device 106) generates an integrity measure. In embodiments where one or more of the other authorised signatory nodes are also consensus nodes then the creation of the integrity measure by these other authorised signatory nodes may be performed by a consensus engine 210 executed on these devices or in separate software outside of the automatically running software of the consensus engine 210.

Continuing with the example above, whereby we refer to using a digital signature as an integrity measure, each of the other authorised signatory nodes (e.g. computing device 102 and computing device 106) signs the regenesis request to generate a digital signature (an integrity measure). For example, computing device 102 may generate a digital signature by encrypting a cryptographic hash of the regenesis request using a cryptographic key (e.g. a private key) associated with the computing device 102. Similarly, computing device 106 may generate a digital signature by encrypting a cryptographic hash of the regenesis request using a cryptographic key (e.g. a private key) associated with the computing device 106.

Once each of the authorised signatory nodes has generated their respective digital signature, the authorised signatory node transmits their digital signature to computing device 104. Thus at step S410, the computing device 104 receives a digital signature of each of the authorised signatory nodes coupled to the network 108. Expressed another way, if there is n authorised signatory nodes coupled to the network 108, the computing device receives n−1 digital signatures at step S410. In the example above, whereby the participant nodes (e.g. computing device 102 and computing device 106) are authorised signatory nodes, the computing device 104 receives digital signatures from computing device 102 and computing device 106.

At step S412, the signature of the computing device 104 and the signatures received at step 410 are then appended to the regenesis request to create a signed regenesis request. The signatures received at step 410 may be ordered in a deterministic manner (e.g. lexicographically) prior to being appended to the signed regenesis request. The creation of the regenesis request is complete after step S412 has been performed.

Figure 5:
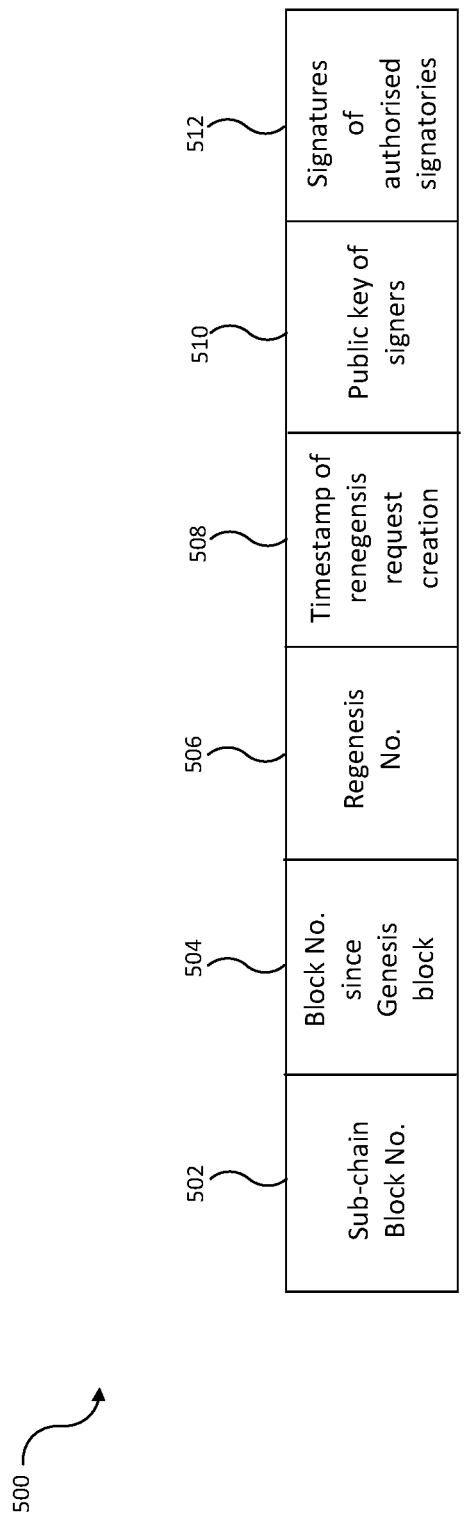
FIG. 5 illustrates a regenesis request.

FIG. 5 illustrates a signed regenesis request 500 following the completion of step S412.

As shown in FIG. 5, the signed regenesis request 500 comprises a block number within the sub-chain 502 and a block number since the genesis block 504. The signed regenesis request 500 also comprises an integrity measure 512.

The integrity measure may take the form of digital signatures 512 of authorised signatory nodes. In some embodiments, the signed regenesis request 500 comprises integrity measures in the form of digital signatures 512 of all of the authorised signatory nodes on the network 108. Requiring that all of the authorised signatory nodes sign the contents of the regenesis request is implemented in order to prevent so-called partitioning attacks where some of the authorised signatory nodes are unaware of a fork in the blockchain. In cases where such partitioning attacks are unlikely, it is possible to relax the signing requirements accordingly. Thus in some embodiments, the signed regenesis request 500 may comprise the integrity measures (e.g. digital signatures) 512 of a predetermined required number of authorised signatory nodes.

Whilst we refer above to the signed regenesis request 500 comprises individual digital signatures of authorised signatory nodes. In other embodiments the integrity measure 512 may take the form of a multi-party signature, associated with all or a required number of the authorised signatory nodes. As is known in the art, a multi-party signature is a digital signature which allows a group of users to sign data, whereby the joint signature is more compact than a collection of distinct signatures from each of the users. The multi-party signature may be in the form of a group signature or a ring signature.

Furthermore, whilst process 400 has been described above with reference to integrity measures being digital signatures, this is merely an example.

In an alternative embodiment, at step S406 instead of the computing device 104 generating a digital signature, the computing device 104 may generate an integrity measure in the form of a Message Authentication Code ("MAC") by providing the regenesis request and a symmetric key as inputs into a MAC algorithm which computes the MAC using known methods. In this example, upon receipt of the regenesis request and the MAC code generated by the computing device 104, each of the authorised signatory nodes generate a MAC code using the symmetric key and supply this to the computing device 104 at step S410.

In another alternative embodiment, at step S406 instead of the computing device 104 generating a digital signature, the computing device 104 may generate an integrity measure in the form of a cryptographic hash by inputting the regenesis request into a one-way hash function. In this example, upon receipt of the regenesis request appended with a cryptographic hash generated by the computing device 104, each of the authorised signatory nodes generate a cryptographic hash using the same one-way hash function and supply this to the computing device 104 at step S410.

In another alternative embodiment, at step S406 instead of the computing device 104 generating a digital signature, the computing device 104 may generate an integrity measure in the form of a reference to a server (e.g. a server hosting an online directory or a measurement server). This reference enables a device attempting to verify the integrity of the transition block to query the server in order to carry out the verification process. Values can be stored in a known online directory then relying parties can contact that directory to either pull good values (for checking later) or ask the online directory whether the data in the modification block is trusted/legitimate questions. In this case the process of checking the integrity of the transition block involves asking and checking the answers (which may carry individual measures of their own). A measurement server is a third party server that knows the "measurements" of data which replying parties can check before they trust it. The measurement server acts as a central authority which can measure (for instance checksum, or hash, or manifest) the approved data and put that measurement on a trusted server. This may provide a more flexible solution than use of a digital signature in some cases, since it allows for more practical extension or individual customization of the code/data across a broad population of users. Similarly at step S412, the integrity measure received from one or more of the authorised signatory nodes may be in the form of a reference to a server.

As shown in FIG. 5 the signed regenesis request 500 generated by the regenesis request creation module 201 may also comprise a regenesis number 506 which indicates how many regenesis-es have taken place since the original genesis block. The regenesis number 506 may be included in the regenesis request generated at step S404. It will be appreciated that for the first time the computing device 104 performs the process 400 (i.e. prior to any regenesis occurring) the regenesis number 506 will be zero. The regenesis request creation module 201 may maintain the regenesis number by way of a monotonic counter which is initialized to zero and is incremented each time a regenesis block is added to the blockchain.

As shown in FIG. 5 the signed regenesis request 500 generated by the regenesis request creation module 201 may also comprise a timestamp indicating the time at which the regenesis request was generated. The timestamp may be included in the regenesis request generated at step S404.

As shown in FIG. 5 the regenesis request generated by the regenesis request creation module 201 may also comprise a public key of each of the authorised signatory nodes (e.g. the public keys of computing devices 102. 104, 106).

Once the signed regenesis request has been created it needs to be packaged into a format that can be easily parsed by a verification script. To do this, at step S414 the transition block creation module 202 packages the signed regenesis request into a transition block.

The transition block comprises the cryptographic hash of the block at the start of its sub-chain. It will be appreciated that for the first sub-chain in the blockchain the block at the start of its sub-chain is a genesis block, and for any other sub-chain in the blockchain the block at the start of the sub-chain is a regenesis block.

The consensus engine 210 on computing device 104 submits the transition block to the network 108 for consensus. That is, the computing device 104 transmits a request to the consensus nodes on the network 108 which requests permission to add the transition block to the blockchain.

If consensus has been reached (determined by the computing device 104 at step S416), the transition block is committed to the blockchain (added as a block at the end of the blockchain) by each of the participant nodes. That is, upon the consensus engine 210 detecting that consensus has been reached the computing device 104 (and also computing device 102 and computing device 106) commits the transition block to the blockchain.

Figure 6:
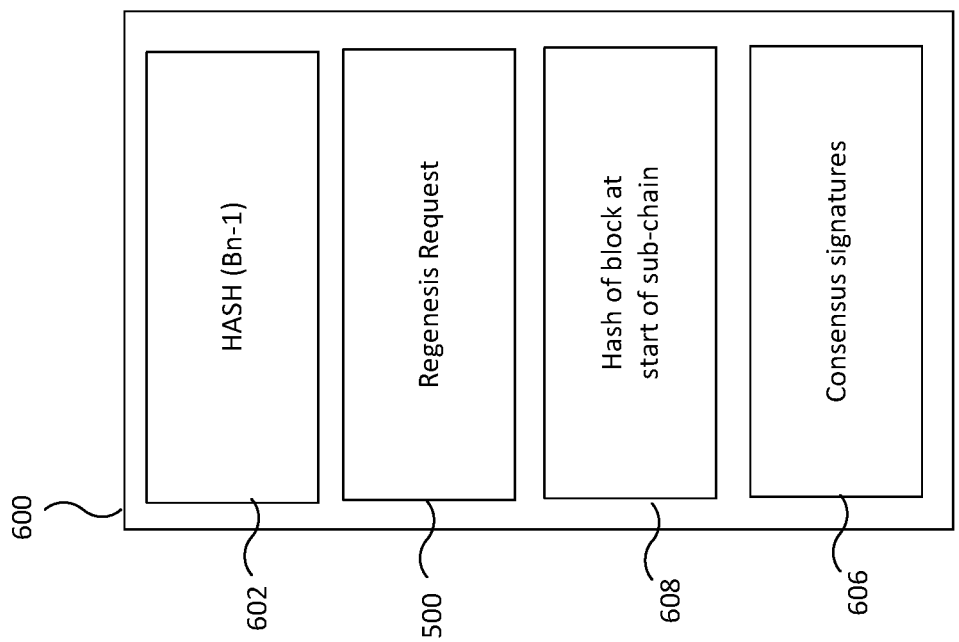
FIG. 6 illustrates a transition block once added to the data structure.

FIG. 6 illustrates a transition block 600 that has been committed to the blockchain. As shown in FIG. 6, the transition block 600 comprises: (i) the cryptographic hash 602 of the previous block, (ii) the signed regenesis request 500, (iii) a cryptographic hash 608 of the block at the start of its sub-chain and (iv) consensus signatures 606 added to the transition block which provide proof that consensus has been reached by the consensus nodes that the transition block should be added to the blockchain.

Referring back to FIG. 4, once the transition block has been committed to the blockchain the process then proceeds to step S418, where the regenesis block creation module 203 creates a regenesis block.

The consensus engine 210 on computing device 104 submits the regenesis block to the network 108 for consensus. That is, the computing device 104 transmits a request to the consensus nodes on the network 108 which requests permission to add the regenesis block to the blockchain.

If consensus has been reached, the regenesis block is committed to the blockchain (added as a block at the end of the blockchain) by each of the participant nodes. That is, upon the consensus engine 210 detecting that consensus has been reached the computing device 104 (and also computing device 102 and computing device 106) commits the regenesis block to the blockchain.

Figure 7:
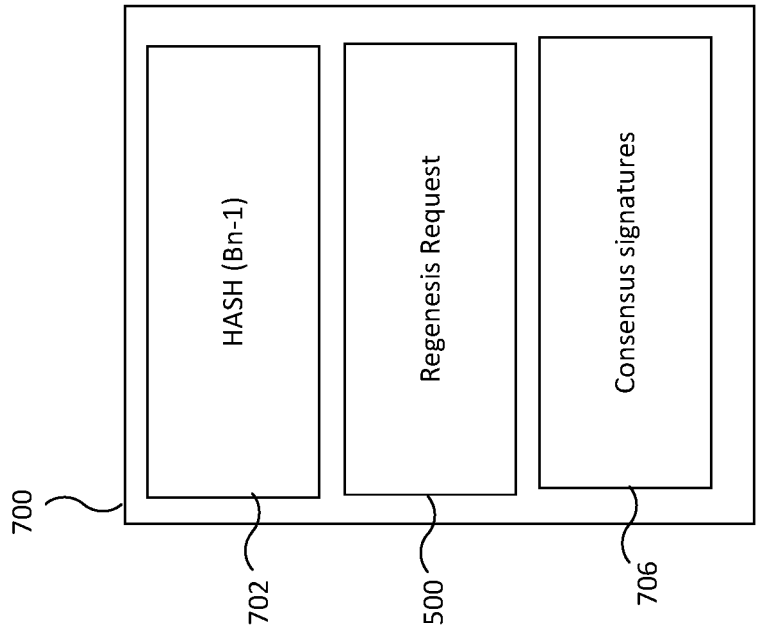
FIG. 7 illustrates a regenesis block once added to the data structure.

FIG. 7 illustrates a regenesis block 700 that has been committed to the blockchain. As shown in FIG. 7, the regenesis block 600 comprises: (i) the cryptographic hash 702 of the previous block i.e. the cryptographic hash of the transition block, (ii) the signed regenesis request 500, and (iii) consensus signatures 706 added to the regenesis block which provide proof that consensus has been reached by the consensus nodes that the regenesis block should be added to the blockchain.

Once the regenesis block has been accepted into the network, the blockchain can continue its operation as normal. The next block appended to the blockchain is a regular block that includes the cryptographic hash of the regenesis block. The regenesis block and each new block added to the blockchain after the regenesis block includes two block numbers: a first block number indicating the number of blocks from the original genesis block, and a second block number (a sub-chain block number) indicating the number of blocks from the regenesis block.

Referring back to step S416, if consensus is not reached (i.e. permission is not granted to modify the selected data block in accordance with the modified block data), then the process proceeds to step S422 where the transition block is not committed to the blockchain by each of the participant nodes and the computing device is configured to perform one of three operations:
1. Fails and stops: unspecified manual intervention required in order for the computing device 104 to recommence adding blocks to the blockchain;
2. Fails and reverts: no regenesis but the computing device 104 continues as normal from the previous block to add new blocks to the original chain;
3. Repeats the process 400 a number of times before eventually performing operation 1 or 2.

Figure 8:
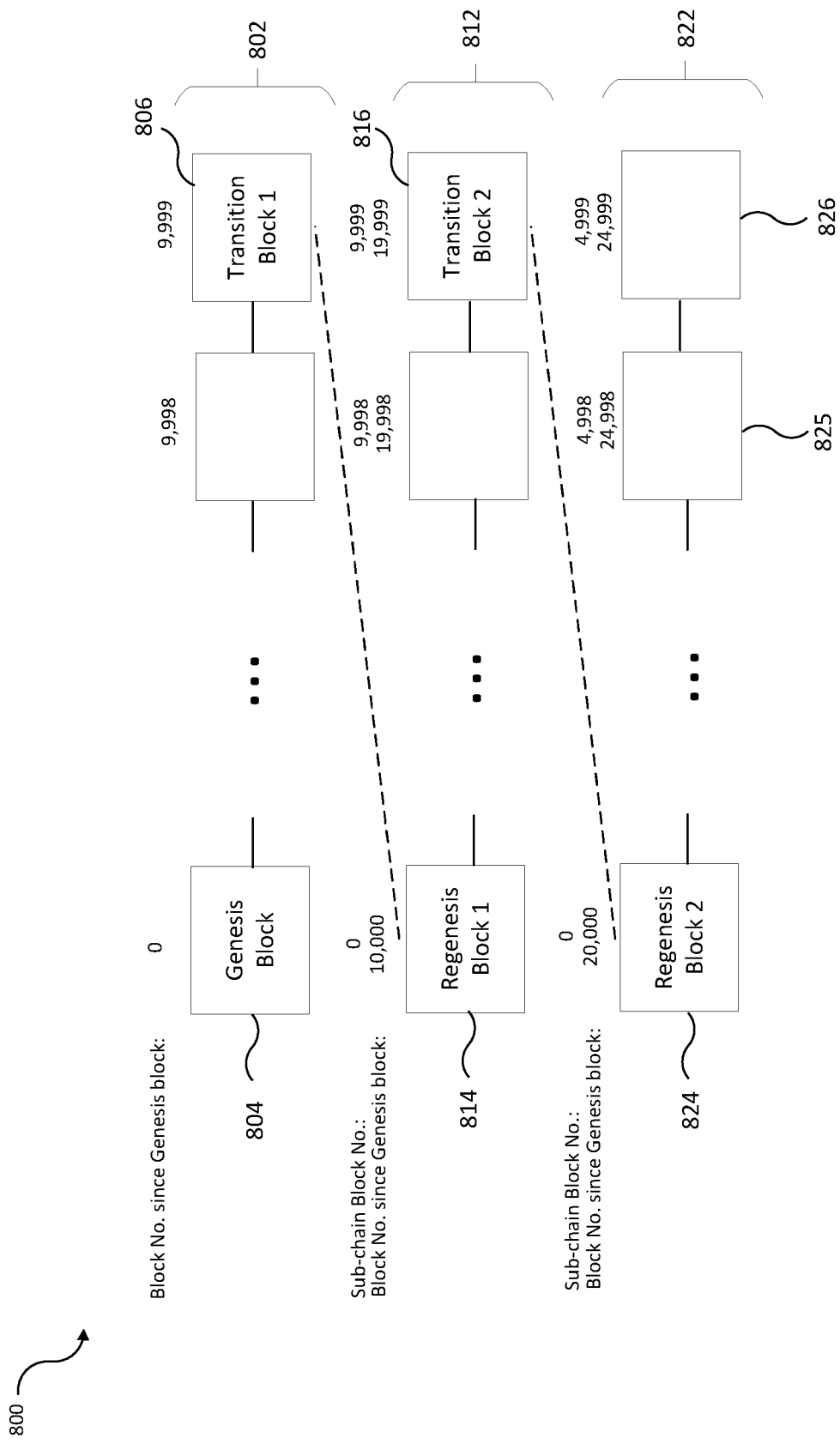
FIG. 8 illustrates the regenesis process.

FIG. 8 illustrates the regenesis process in more detail with reference to an example blockchain 800 comprising multiple sub-chains.

As shown in FIG. 8 the genesis block 804 is the first block of the blockchain 800 and the first block of a first sub-chain 802. All of the blocks in the blockchain comprise a block number which indicates the number of blocks in the blockchain from the genesis block.

At a point in time, the computing device 104 detects that the blockchain that is stored in memory associated with the computing device 104 meets predetermined criteria e.g. the length of the blockchain has reached a predetermined threshold number of blocks, and thus a new successor sub-chain is needed. FIG. 8 illustrates an example whereby the predetermined threshold number of blocks is 9,999 blocks. In response to this detection, a first transition block 806 is added to the blockchain thus completing a first sub-chain 802 comprising the genesis block 804, a plurality of data blocks, and ending with the first transition block 806.

The first transition block 806 comprises a signed regenesis request 500 comprising a sub-chain block number 502 having a value of 9,998 and a block number 504 since the genesis block also having a value of 9,998.

As shown in FIG. 8, all transition blocks are immediately followed by a regenesis block. Furthermore, all sub-chains that follow the first sub-chain 802 have a regenesis block as the first block in the sub-chain.

FIG. 8 illustrates a first regenesis block 814 that follows the transition block 806. The regenesis block 814 is the first block in a second sub-chain 812.

The first regenesis block 814 comprises the regenesis request described above which includes a sub-chain block number 502 having a value of 9,998 and a block number 504 since the genesis block also having a value of 9,998.

The regenesis block 814 also has a first block number which indicates the number of blocks in the blockchain from the genesis block 804 (e.g. 10,000 in this example). Thus, the first block number of the regenesis block 814 sequentially follows the block number of the transition block 806. In addition, the regenesis block 814 additionally comprises a second block number which indicates the number of blocks in the sub-chain from the first block in the sub-chain (e.g. 0). Thus the second block number of the regenesis block 814 has an initial value that does not sequentially follow the block number of the transition block 806. The block numbers used in embodiments of the present disclosure are not limited to being a number and may comprise one or more alphanumeric character.

New blocks that are added to the blockchain 800 after the regenesis block 814 also comprise these two block numbers: (1) a block number which indicates the number of blocks in the blockchain from the genesis block; and (2) an additional block number which indicates the number of blocks in the sub-chain from the first block in the sub-chain.

At a point in time, the computing device 104 detects that the blockchain that is stored in memory associated with the computing device 104 meets predetermined criteria e.g. the length of the first sub-chain 812 has reached a predetermined threshold number of blocks, and thus a new successor sub-chain is needed. In response to this detection, a second transition block 816 is added to the blockchain thus completing the second sub-chain 812 comprising the regenesis block 814, a plurality of data blocks, and ending with the transition block 816.

The second transition block 816 comprises a signed regenesis request 500 comprising a sub-chain block number 502 having a value of 9,998 and a block number 504 since the genesis block having a value of 19,998.

FIG. 8 illustrates a second regenesis block 824 that follows the transition block 816. The second regenesis block 824 is the first block in a third sub-chain 822. As shown in FIG. 8 the third sub-chain 822 comprises data blocks following the second regenesis block 824 (e.g. block 825 and block 826) however the sub-chain 822 has not yet met the predetermined threshold number of blocks and thus a transition block has not been added to the blockchain 800.

The second regenesis block 824 comprises the regenesis request described above which includes a sub-chain block number 502 having a value of 9,998 and a block number 504 since the genesis block having a value of 19,998.

It will be apparent from the above that the plurality of linked data blocks in each "sub-chain" each have a sub-chain block number which indicates the location of the block within the sub-chain with reference to the first block of the sub-chain (which is at the beginning of the sub-chain).

As shown in FIG. 8, in embodiments of the present disclosure that are applied to blockchain, the blockchain maintains its linear structure with the sub-chains representing portions of the blockchain. It will be appreciated that embodiments of the present disclosure can be applied to other distributed ledger technologies.

Figure 9A:
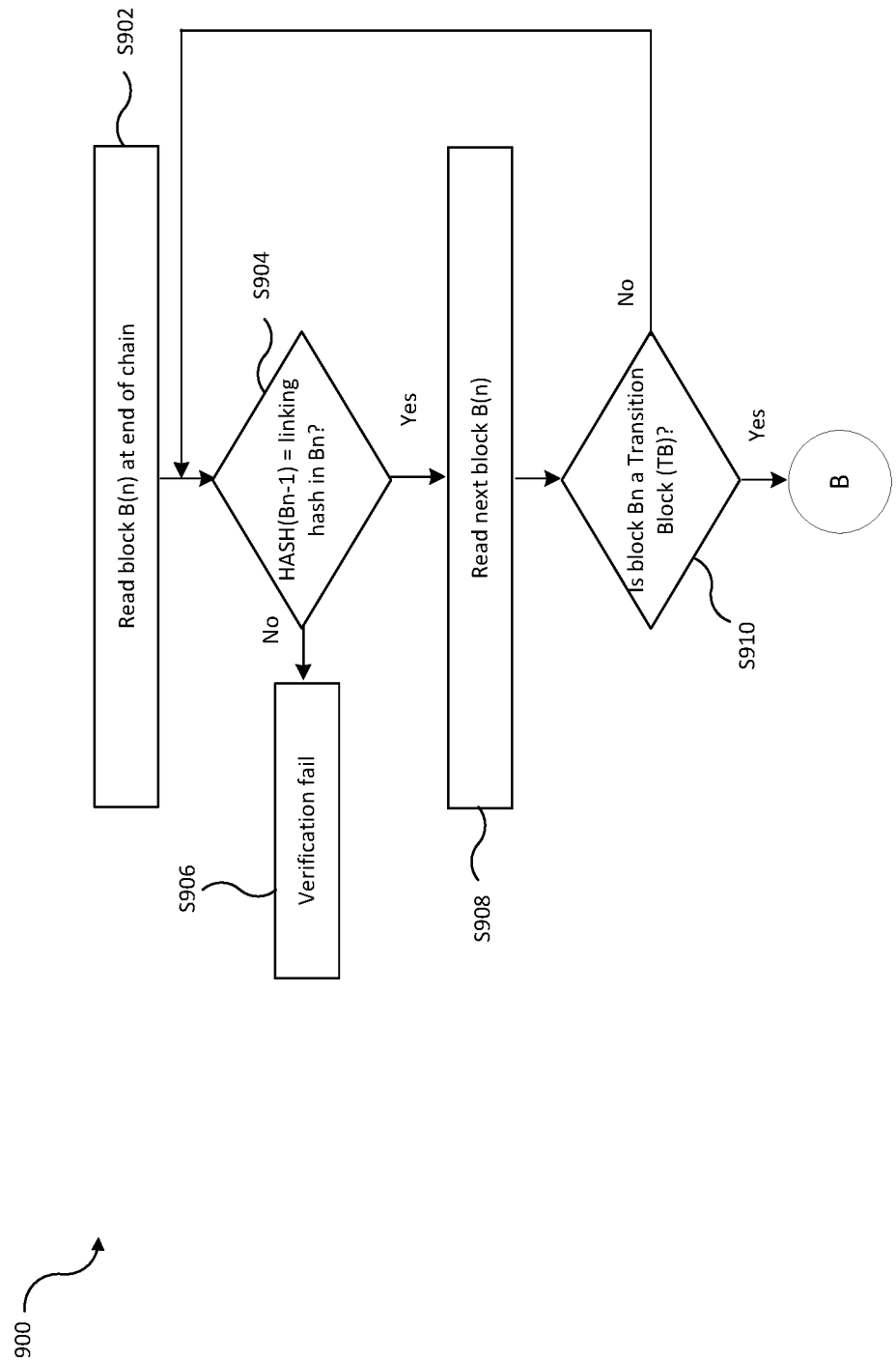
FIGS. 9*a-b* is a flow chart of a process for verifying the integrity of a data structure comprising a transition block and a regenesis block.
Figure 9B:
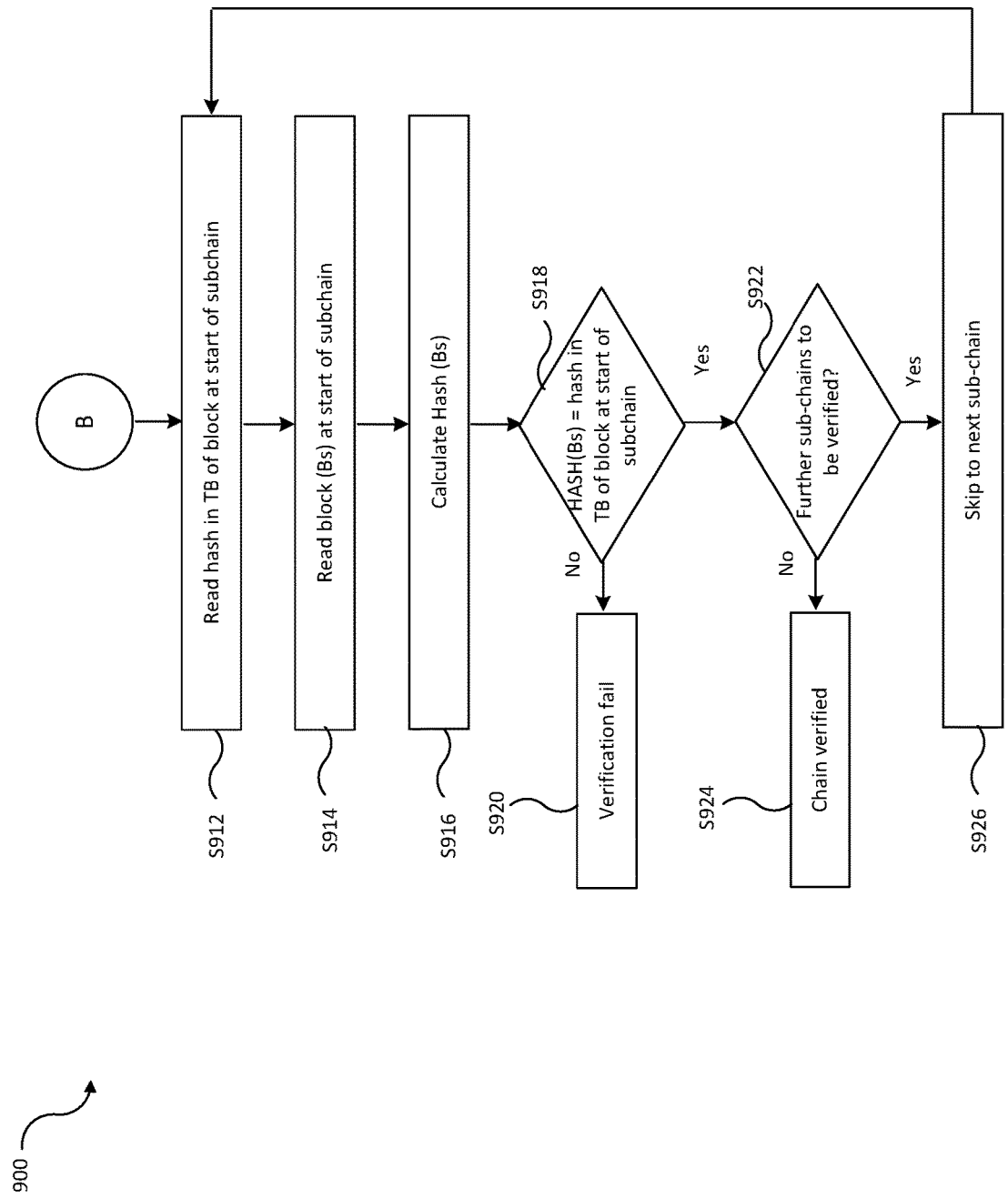

Reference is now made to FIG. 9*a-b*, which shows a flow chart of a process 900 for verifying the integrity of a blockchain comprising a transition block 600 and a regenesis block 700 that is performed by a chain verification module 204 on a computing device.

As shown FIG. 9*a*, the process 900 starts at step S902 where the block B(n) at the end of the blockchain, e.g. block 826 of blockchain 800, is read by the chain verification module 204.

At step S904 the chain verification module 204 determines whether the cryptographic hash of the preceding block B(n−1), e.g. block 825 of blockchain 800, is included in the block B(n).

If the chain verification module 204 determines that the cryptographic hash of the preceding block B(n−1) is not present in the block B(n) then the process proceeds to step S906 where the verification of the integrity of the blockchain fails.

At step S908, the chain verification module 204 reads the next block on the blockchain B(n) (moving in the direction towards the genesis block).

If at step S910, the chain verification module 204 determines that the block read at step S908 is a transition block (e.g. transition block 816 of blockchain 800) i.e. the integrity verification process 900 has reached a block at the end of a sub-chain (e.g. sub-chain 812 in FIG. 8), the process proceeds to step S912, otherwise the process loops backs to the determination at step S904. The determination at step S910 as to whether block Bn is a transition block may comprise whether the block Bn has contents in a format associated with a transition block. That is, the determination at step S910 may be based on whether the block comprises data fields associated with the contents of the regenesis request 500 and a data field associated with a cryptographic hash of a block at the start of the sub-chain (e.g. a cryptographic hash of regenesis block 814).

FIG. 9b illustrates the steps performed by the chain verification module 204 upon encountering a transition block 600 (determined at step S910).

At step S912, the chain verification module 204 reads the cryptographic hash 608 of the block at the start of the sub-chain that is included in the transition block. It will be appreciated that for the first sub-chain in the blockchain (e.g. sub-chain 802) the block at the start of its sub-chain is a genesis block, and for any other sub-chain in the blockchain (e.g. sub-chain 812) the block at the start of the sub-chain is a regenesis block.

At step S914, the chain verification module 204 reads the block B(s) (e.g. regenesis block 814 of blockchain 800) at the start of the sub-chain (e.g. sub-chain 812 of blockchain 800), and at step S916 computes a cryptographic hash of the block at the start of the sub-chain.

At step 918, the chain verification module 204 determines whether the cryptographic hash of the block at the start of the sub-chain determined at step S916 matches the cryptographic hash 608 of the block at the start of the sub-chain that is included in the transition block.

If the computed cryptographic hash of the block at the start of the sub-chain does not match the cryptographic hash 608 of the block at the start of the sub-chain that is included in the transition block, then the process proceeds to step S920 where the verification of the integrity of the blockchain fails.

If the computed cryptographic hash of the block at the start of the sub-chain does match the cryptographic hash 608 of the block at the start of the sub-chain that is included in the transition block, then the chain verification module 204 successfully verifies the integrity of the subchain and then the process proceeds to step S922.

At step S922, the chain verification module 204 determines whether there are further sub-chains of the blockchain to verify. If there are no further sub-chains of the blockchain to verify (the previous sub-chain verified comprises the genesis block) then the process proceeds to step S924 where the chain verification module 204 successfully verifies the integrity of the blockchain.

If there are further sub-chains of the blockchain to verify (the previous sub-chain verified comprises a regenesis block) then the process proceeds to step S926 where the chain verification module 204 skips to the next (earlier) sub-chain in the blockchain, and in particular skips to the next transition block and the process loops back to step S912.

The verification is complete when the genesis block is reached (i.e. the sub-chain beginning with the genesis block is verified).

It will be apparent that in the second embodiment, rather than having to store every block of every sub-chain a computing device is only required to store (i) the genesis block, (ii) all transition blocks, (iii) all regenesis blocks, and (iv) all blocks of the final sub-chain (e.g. blocks 824-826 in FIG. 8). This enables the computing device to verify that there has been no additions to the chain, no removals to the chain, and no modifications to the chain. Having the genesis block ensures nothing has been snipped off the beginning of the chain, having the complete chain of trailing end blocks (of the final sub-chain) ensures nothing has been snipped off the end of the chain, and having coherent pairs of {transition, regenesis} blocks ensures nothing has been snipped out of the middle of the chain. Any other block does not have to be retained by the computing device and the integrity of the blockchain can still be validly verified by the computing device.

Thus it can be seen that embodiments of the present disclosure enable enterprise adoption of distributed ledger technology by retaining the trust and security properties of DLT whilst freeing them of the burden of procuring and maintaining unbounded storage space.

Generally, any of the functions described herein can be implemented using software, firmware, hardware (e.g., fixed logic circuitry), or a combination of these implementations. The terms "module" as used herein generally represent software, firmware, hardware, or a combination thereof. In the case of a software implementation, the module represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of maintaining a data structure comprising a plurality of linked data blocks, the method implemented on a computing device, and comprising:
   creating a data block to be added to the data structure, wherein creating the block to be added to the data structure comprises:
      generating a request, the request comprising a block number associated with an end data block at an end of the data structure;
      generating an integrity measure associated with the computing device;
      transmitting the request and the integrity measure to one or more authorized signatory computing devices over a communication network; and
      receiving, via the communication network, at least one integrity measure associated with the one or more authorized signatory computing devices;
   wherein said block once added to the data structure comprises the request, the integrity measure associated with the computing device, the at least one integrity measure associated with the one or more authorized signatory computing devices, and a cryptographic hash of the end data block;
   transmitting a message to a plurality of validator computing devices over the communication network, said message requesting permission to add said data block to the data structure;
   determining that consensus is reached by the plurality of validator computing devices that said data block can be added to the data structure, and in response to said determining:
      forming a first sub-chain in the data-structure by adding the data block to the data structure, the first sub-chain starting with a genesis block and ending with said data block, wherein the data block comprises a block number indicating a number of blocks in the data structure from the genesis block, and creating a further data block;
transmitting a further message to the plurality of validator computing devices over a communication network, said further message requesting permission to add said further data block to the data structure;
determining that consensus is reached by the plurality of validator computing devices that said further data block can be added to the data structure, and in response to said determining, forming a second sub-chain by adding the further data block to the data structure after said data block, the second sub-chain starting with said further data block, wherein the further block comprises (i) a first block number indicating a further number of blocks in the data structure from the genesis block; and (ii) a second block number indicating a number of blocks in the second sub-chain from the further data block.

2. The method of claim 1, wherein the further data block once added to the data structure comprises the request, the integrity measure associated with the computing device, the at least one integrity measure associated with the one or more authorized signatory computing devices, and a cryptographic hash of the data block.

3. The method of claim 1, wherein creating the data block to be added to the data structure is triggered in response to detecting that the data structure satisfies predetermined criteria.

4. The method of claim 3, wherein creating the data block to be added to the data structure is triggered in response to detecting that a length of the data structure has reached a predetermined threshold number of blocks.

5. The method of claim 3, wherein creating the data block to be added to the data structure is triggered in response to detecting that a total storage size of the blocks of the data structure has reached a predetermined threshold size.

6. The method of claim 1, wherein creating the data block to be added to the data structure is triggered in response to receiving a message from a remote computing device.

7. The method of claim 1, wherein the further data block comprises the signed request and a cryptographic hash of said data block.

8. The method of claim 1, wherein the integrity measure associated with the computing device comprises a digital signature, a Message Authentication Code or a cryptographic hash.

9. The method of claim 1, wherein each of the at least one integrity measure associated with the one or more authorized signatory computing devices comprises a digital signature, a Message Authentication Code or a cryptographic hash.

10. The method of claim 1, wherein the data structure comprising the plurality of linked data blocks is stored in memory of the computing device, and the method further comprises:
removing from memory one or more data blocks located in the data structure between the genesis block and said data block.

11. The method of claim 1, wherein said data block comprises a cryptographic hash of the genesis block.

12. The method of claim 1, wherein the data structure is structured in accordance with a distributed ledger technology.

13. A non-transitory computer-readable storage medium comprising instructions which, when executed by a processor of a computing device cause the computing device to perform the method of claim 1.

14. A computing device for maintaining a data structure comprising a plurality of linked data blocks, wherein the data structure is stored in memory accessible to
the computing device, and the computing device comprising a processor configured to:
create a data block to be added to the data structure, wherein creating the block to be added to the data structure comprises:
generating a request, the request comprising a block number associated with an end data block at an end of the data structure;
generating an integrity measure associated with the computing device;
transmitting the request and the integrity measure to one or more authorized signatory computing devices over a communication network; and
receiving, via the communication network, at least one integrity measure associated with the one or more authorized signatory computing devices;
wherein said block once added to the data structure comprises the request, the integrity measure associated with the computing device, the at least one integrity measure associated with the one or more authorized signatory computing devices, and a cryptographic hash of the end data block;
transmit a message to a plurality of validator computing devices over the communication network, said message requesting permission to add said data block to the data structure;
determine that consensus is reached by the plurality of validator computing devices that said data block can be added to the data structure, and in response to said determination:
form a first sub-chain in the data-structure by adding the data block to the data structure, the first sub-chain starting with a genesis block and ending with said data block, wherein the data block comprises a block number indicating the number of blocks in the data structure from the genesis block, and
create a further data block;
transmit a further message to the plurality of validator computing devices over a communication network, said further message requesting permission to add said further data block to the data structure;
determine that consensus is reached by the plurality of validator computing devices that said further data block can be added to the data structure, and in response to said determination, form a second sub-chain by adding the further data block to the data structure after said data block, the second sub-chain starting with said further data block, wherein the further block comprises (i) a first block number indicating a further number of blocks in the data structure from the genesis block; and (ii) a second block number indicating a number of blocks in the second sub-chain from the further data block.

15. A method of maintaining a data structure comprising a plurality of linked data blocks, the method implemented on a computing device, and comprising:
creating a data block to be added to the data structure, wherein creating the data block to be added to the data structure is triggered in response to detecting that a total storage size of the linked data blocks of the data structure has reached a predetermined threshold size;

transmitting a message to a plurality of validator computing devices over a communication network, said message requesting permission to add said data block to the data structure;
determining that consensus is reached by the plurality of validator computing devices that said data block can be added to the data structure, and in response to said determining:
   forming a first sub-chain in the data-structure by adding the data block to the data structure, the first sub-chain starting with a genesis block and ending with said data block, wherein the data block comprises a block number indicating a number of blocks in the data structure from the genesis block, and
   creating a further data block;
transmitting a further message to the plurality of validator computing devices over a communication network, said further message requesting permission to add said further data block to the data structure;
determining that consensus is reached by the plurality of validator computing devices that said further data block can be added to the data structure, and in response to said determining, forming a second sub-chain by adding the further data block to the data structure after said data block, the second sub-chain starting with said further data block, wherein the further block comprises (i) a first block number indicating a further number of blocks in the data structure from the genesis block; and (ii) a second block number indicating a number of blocks in the second sub-chain from the further data block.

* * * * *